(12) United States Patent
Harper

(10) Patent No.: US 7,588,077 B2
(45) Date of Patent: Sep. 15, 2009

(54) DOWNHOLE TUBULAR SEAL SYSTEM AND METHOD

(75) Inventor: Jason M. Harper, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 124 days.

(21) Appl. No.: 11/850,105

(22) Filed: Sep. 5, 2007

(65) Prior Publication Data
US 2009/0058017 A1 Mar. 5, 2009

(51) Int. Cl.
*E21B 33/128* (2006.01)
(52) U.S. Cl. .................. 166/196; 166/191; 166/387; 277/340
(58) Field of Classification Search .......... 166/196, 166/191, 387; 277/340
See application file for complete search history.

(56) References Cited

U.S. PATENT DOCUMENTS

| 3,472,520 A * | 10/1969 | Burns .................. 277/339 |
| 6,527,049 B2 | 3/2003 | Metcalfe et al. |
| 6,896,049 B2 | 5/2005 | Moyes |
| 2004/0149454 A1 | 8/2004 | Metcalfe et al. |
| 2005/0005981 A1* | 1/2005 | Eidsmore et al. ............ 137/884 |

OTHER PUBLICATIONS

"High Expansion Metal Seal Eliminates Failures Common to Elastomer Seals," JPT Online, Oct. 5, 2006. 2 pages.

Head, Phil, et al. "Slimwell Concept- Innovative Coiled Tubing Completion Technology," SPE 54492, Houston, Toexas, May 25-26, 1999. 14 pages.

Rignol, J., et al. "Worldwide First Run in Hole of a Dope-Free 13Cr Production Tubing String," SPE 95507, Dallas Texas, Oct. 9-12, 2005. 5 pages.

Baker, Alan, et al. "Permanent Monitoring- Looking at Lifetime Reservoir Dynamics," Oilfield Review, Winter 1995. pp. 32-46. 15 pages.

International Search Report with Written Opinion, PCT/US2008/074190, date mailed Feb. 16, 2009, Search Report having 10 pages, Written Opinion having 7 pages.

* cited by examiner

*Primary Examiner*—Giovanna C Wright
(74) *Attorney, Agent, or Firm*—Cantor Colburn LLP

(57) ABSTRACT

Disclosed herein is a downhole tubular sealing system. The sealing system includes, a deformable tubular sealable to a first tubular and a second tubular. The deformable tubular includes, a first deformable portion configured to deform in a first radial direction, a second deformable portion configured to deform in a second radial direction, and a third deformable portion configured to deform in the first radial direction. The second deformable portion is positioned longitudinally between the first deformable portion and the third deformable portion and at least one of the first deformable portion and the third deformable portion is sealable to the first tubular when the first deformable portion or the third deformable portion is deformed. Further, the second deformable portion is sealable to the second tubular when the second deformable portion is deformed.

25 Claims, 3 Drawing Sheets

US 7,588,077 B2

DOWNHOLE TUBULAR SEAL SYSTEM AND METHOD

BACKGROUND OF THE INVENTION

In the hydrocarbon recovery industry it is often necessary to seal tubulars to one another in a downhole environment. Packers, for example, typically employ seals with packing elements that when actuated seal one tubular to another tubular. These seals can be complicated assemblies that require significant actuation forces to set as well as to maintain their seal integrity. Additionally, the reliability and durability of these seals in high pressure, high temperature and caustic environments often encountered downhole can be questionable. As such, a reliable downhole tubular to tubular seal that is easy to set would be welcomed in the art.

BRIEF DESCRIPTION OF THE INVENTION

Disclosed herein is a downhole tubular sealing system. The sealing system includes, a deformable tubular sealable to a first tubular and a second tubular. The deformable tubular includes, a first deformable portion configured to deform in a first radial direction, a second deformable portion configured to deform in a second radial direction, and a third deformable portion configured to deform in the first radial direction. The second deformable portion is positioned longitudinally between the first deformable portion and the third deformable portion and at least one of the first deformable portion and the third deformable portion is sealable to the first tubular when the first deformable portion or the third deformable portion is deformed. Further, the second deformable portion is sealable to the second tubular when the second deformable portion is deformed.

Further disclosed herein is a method of sealing downhole tubulars together. The method includes, positioning a deformable tubular in an annular space between a first tubular and a second tubular. The deformable tubular has a first deformable portion a second deformable portion and a third deformable portion. The second deformable portion is positioned longitudinally between the first deformable portion and the third deformable portion. Radially deforming the first deformable portion into contact with the first tubular. Radially deforming the second deformable portion into contact with the second tubular. Radially deforming the third deformable portion into contact with the first tubular. And sealingly engaging the first tubular to the second tubular by sealingly engaging the first tubular with at least one of the first deformable portion and the third deformable portion and sealingly engaging the second tubular with the second deformable portion.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
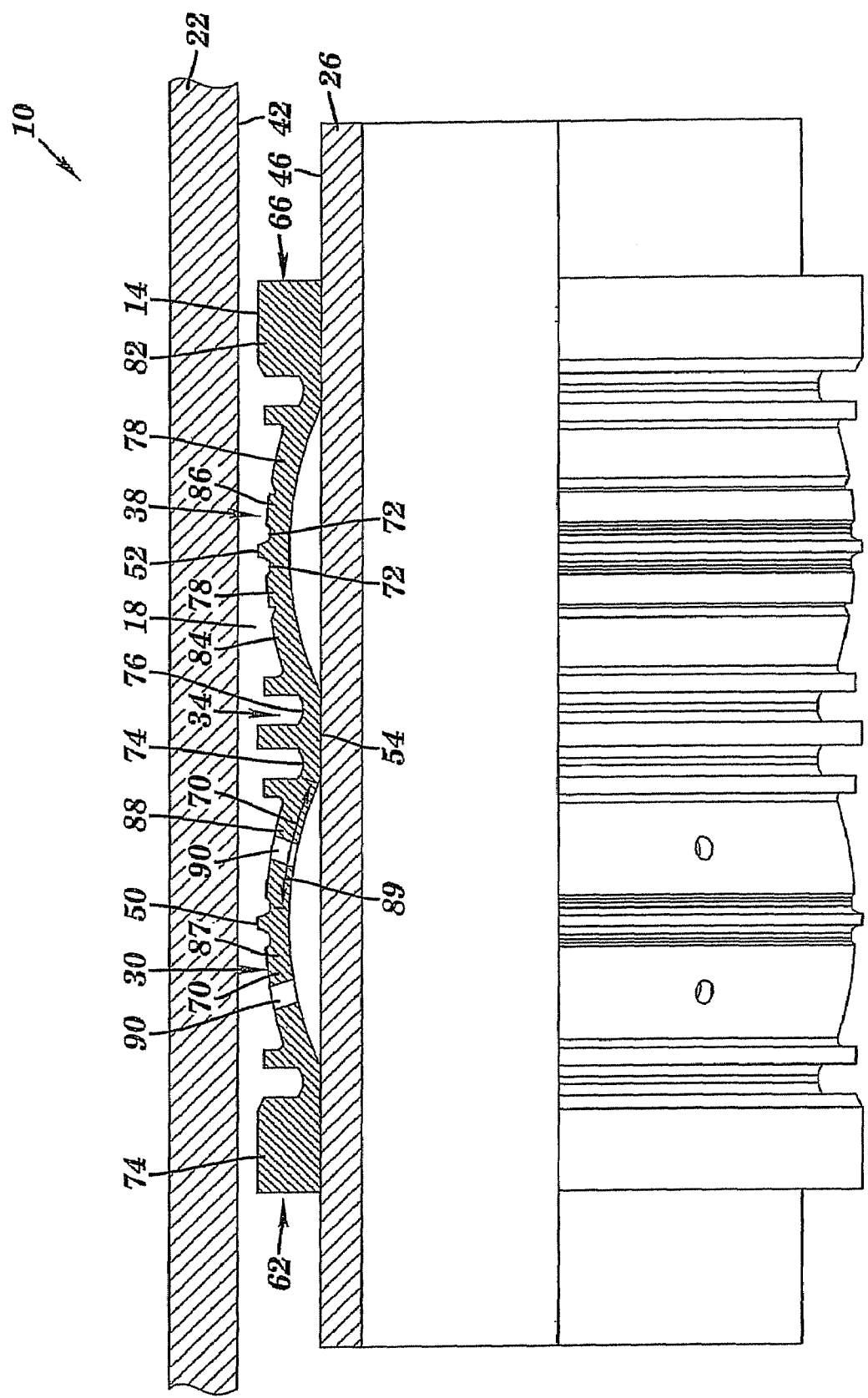
FIG. 1 depicts a quarter cross sectional view of the tubular sealing system disclosed herein.
Figure 2:
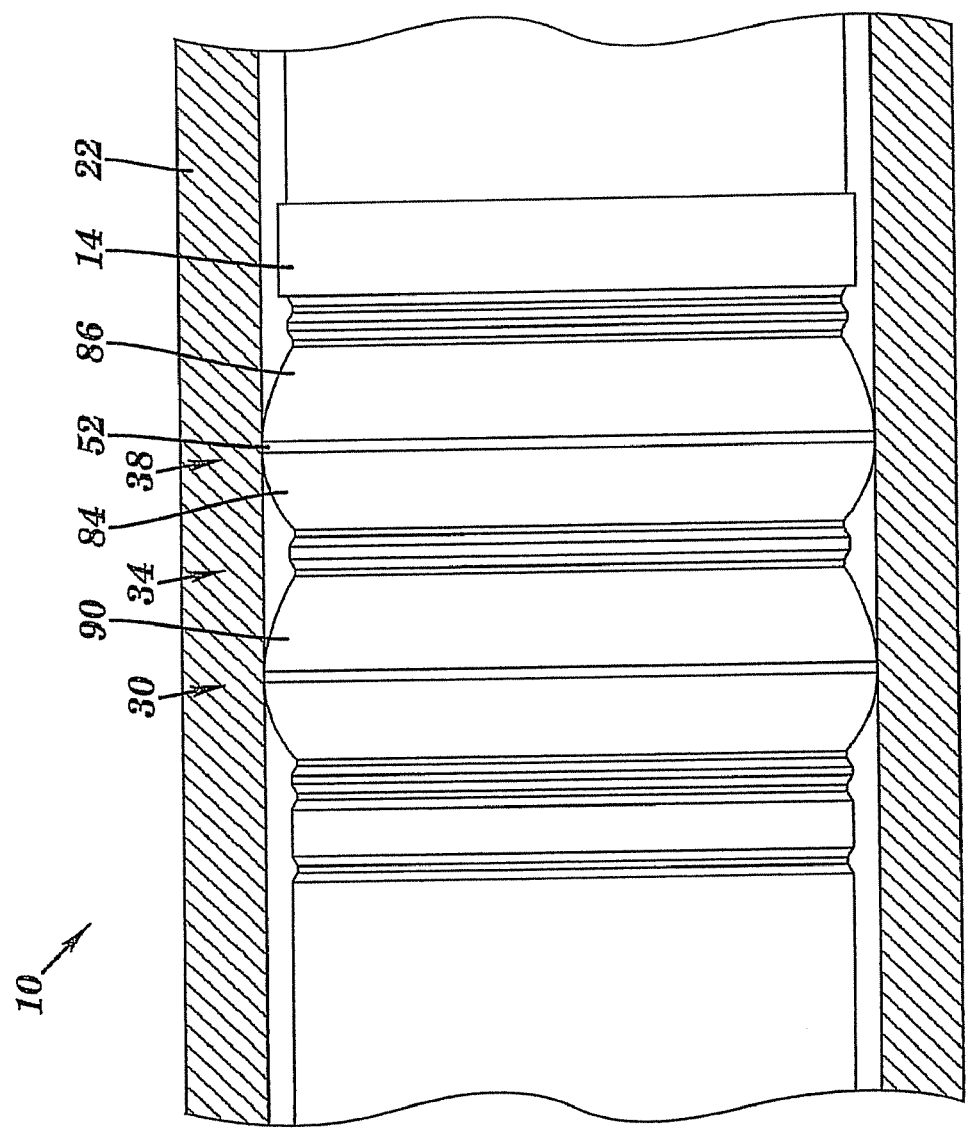
FIG. 2 depicts a deformable tubular disclosed herein shown in a deformed configuration within a sectioned tubular.

Referring to FIG. 1, the downhole tubular sealing system 10 disclosed herein is illustrated. The sealing system 10 includes a deformable tubular 14, made of a strong deformable material such as metal, for example, positioned within an annular space 18 defined by a first tubular 22, positioned radially outwardly of the deformable tubular 14, and a second tubular 26, positioned radially inwardly of the deformable tubular 14. The deformable tubular 14 is sealable to both the first tubular 22 and the second tubular 26 when in a deformed configuration (as shown in FIG. 2). The deformable tubular 14 has at least three deformable portions 30, 34, 38, of which three are disclosed in this embodiment, positioned longitudinally along the deformable tubular 14. The deformable tubular 14 is configured such that the second deformable portion 34 is located longitudinally between the first deformable portion 30 and the third deformable portion 38.

Additionally, the deformable tubular 14 is constructed such that the second deformable portion 34 deforms radially in a direction opposite to a radial direction in which the first deformable portion 30 and the third deformable portion 38 deform. For example, in this embodiment, the second deformable portion 34 deforms radially inwardly and the first deformable portion 30 and the third deformable portion 38 deform radially outwardly. All three of the deformable portions 30, 34, 38, in this embodiment, deform radially in response to axial compression thereof. The radial extent of the deformations is limited by contact that occurs between the deformable portions 30, 34, 38 and an inwardly facing surface 42 of the first tubular 22, and an outwardly facing surface 46 of the second tubular 26. More specifically, the deformable portions 30, 38 deform radially outwardly until seal beads 50 and 52, positioned on the deformable portions 30 and 38 respectively, make contact with the inwardly facing surface 42. Similarly, the second deformable portion 34 deforms radially inwardly until a seal surface thereon, disclosed herein as seal bead 54, makes contact with the outwardly facing surface 46. In this embodiment, the seal bead 52 sealably engages with the inwardly facing surface 42 while the seal bead 54 sealably engages with the outwardly facing surface 46. The foregoing structure thus seals the first tubular 22 to the secondly tubular 26 through the sealing engagements of the tubulars 22, 26 with the deformable tubular 14 since the deformable tubular 14 has continuous walls between the seal bead 52 and the seal bead 54. Forces causing the seal bead 54 to deform radially inwardly are magnified by the presence of the first deformable portion 30 and thereby increase the sealing integrity of the seal bead 54 with the surface 46. Specifically how the first deformable portion 30 aids to sealing the deformable tubular 14 with the second tubular 26 will be described in greater detail below.

As mentioned above, deformation of the three deformable portions 30, 34, and 38, of the deformable tubular 14, results from axial compression thereof. Such axial compression can be performed by any of a variety of actuation tools (not shown) that are known in the industry. In this embodiment the deformable tubular 14 has contact surfaces 62 and 66, which essentially define the longitudinal extent of the deformable tubular 14 and provide surfaces for an actuation tool to contact during axial compression thereof. The redirection of axial compression of the deformable tubular 14 into radial deformation of the deformable portions 30, 34, 38 is facilitated by construction thereof. Such deformable construction can be created by local changes in physical strength of the material in the deformable portions 30, 34, 38, for example.

Local changes in the physical strength of the deformable portions 30, 34 and 38 can be created by geometric features of the deformable portions 30, 34, 38, as is the case with an embodiment disclosed herein. The deformable tubular 14 includes walls 70, 72, 74, 76, 78, which form the deformable portions 30, 34 and 38 respectively. The walls 70, 72, 74, 76, 78 by being thinner than walls 82 are weaker and thus deform more readily than walls 82. For example, the walls 78 on either side of seal bead 52 form legs 84 and 86. Similarly, the walls 70 on either side of the seal bead 50 form legs 87 and 88. The legs 84, 86, having a greater radial dimension near the seal bead 52 as opposed to near either the wall 82 or the seal bead 54, form a structure that tends to radially deform the legs 84, 86 in an outwardly direction in response to axial compression thereof. Additionally, in this embodiment the legs 84, 86 have an arcuate shape to further control the radial direction in which the walls 78 will deform. The walls 70 have a similar shape to that of the walls 78, and as such the deformable portion 30 will also deform radially outwardly similar to that of the deformable portion 38. In contrast, the radial relationship of the deformable portion 34 to the deformable portions 30 and 38 creates a structure that will cause the deformable portion 34 to deform radially inwardly in response to axial compression of the sealing system 10.

As mentioned above, the presence of the first deformable portion 30 increases the inwardly directed forces on the second deformable portion 34 over what they would be without the first deformable portion 30 being present. This is due to the leg 88 of the first deformable portion 30 that is located between the seal beads 50 and 54. The leg 88 need not be perfectly straight, but any out of straight configuration should be small such that the leg has substantial compressive strength over its length 89. By being compressively strong, the leg 88 can become wedged between the inwardly facing surface 42 and the outwardly facing surface 46 in response to deformation of the first deformable portion 30. Once the leg 88 is wedged, any additional axial compression of the deformable tubular 14 causes increased radial loading of the seal beads 50, 52 and 54 into the surfaces 42 and 46. Adjusting the length 89 as compared to an annular dimension between the surfaces 42 and 46 can control the amount of radial loading in response to axial compression. For example, by setting the length 89 close to the annular dimension the force is increased. This is due to the increase in the angle of the leg 88 relative to an axis of the sealing system 10. Such increases in radial forces between the deformable tubular 14 and the tubulars 22 and 26 will improve the sealing integrity therebetween.

The wedging action described above can also be used to control what pressures can be maintained by the sealing system 10. For example, by setting a length of the leg 84 to become wedgably engaged between the first tubular 22 and the second tubular 26, a pressure from downhole, in this embodiment, will put the wedged leg 84 into compression, thereby requiring the leg 84 to buckle before failure of the seal will occur. This wedging action causes an increase in downhole pressures to increase the sealing forces of both the seal bead 52 against the surface 42 and the seal bead 54 against the surface 46, thereby improving the seal integrity in the process. Consequently, the sealing system 10 can seal much higher pressures with thinner walled components than conventional sealing systems. Consequently, actuation tools to actuate the sealing system 10 disclosed herein can be made smaller since less force is required to actuate the thin walled components. These smaller and thinner components and tools will save time and money in material and labor to construct while increasing robustness of seal integrity. The disclosed sealing system 10 also boosts seal integrity since the sealing components, specifically the deformable tubular 14, can be made completely out of metal thereby increasing seal integrity over seals utilizing elastomers and polymers which can degrade chemically in high temperature, high pressure and caustic environments that are typically found downhole.

In addition to controlling the direction of deformation of the deformable portions 30, 34, 38, thicknesses of the walls 70, 72, 74, 76, 78 can be used to control relative actuation timing of the three deformable portions 30, 34, 38. For example, by making the walls 78 thinner than the walls 70, 72, 74 and 76, and the wall 76 thinner than the wall 74, the three deformable portions 30, 34, 38 can be made to deform in the sequence of deformable portion 38 first, deformable portion 34 second, and deformable portion 30 third. Such sequential control of deformation may be desirable since deformation and seal setting forces can be more accurately controlled if there is not a deformed and actuated seal located between the actuator and the deformable portion being actuated as could happen without adequate control of actuation sequences.

Varying wall thicknesses of the walls 70, 72, 74, 76, 78, can control deformation, of the deformable portions 30, 34, and 38. In FIG. 2, for example, the deformable portion 38 is deformed longitudinally nonsymmetrically about the seal bead 52. The leg 84 on an uphole side of the seal bead 52, in this embodiment, has undergone more deformation than the leg 86 on a downhole side of the seal bead 52. As a result, the deformable tubular 14 when made from a workhardenable material, such as steel, for example, can be made to be workhardened to varying degrees at different locations. Controlling the degree of work hardening in different locations of the deformable tubular 14 can permit a designer of the sealing system 10 to control the amount of pressure that can be maintained by the sealing system 10 without leakage, for example, since the material strength due to the work hardening can be precisely estimated. Such pressure control via workhardening of the materials can used in unison with the pressure control via wedging of legs as described above.

Additionally, the thicknesses of the walls 70, 72, 74, 76, 78 can be used to prevent over compression of the seals 50, 52 and 54. For example, as described above, the wall thicknesses controlled both the deformation and sequence of actuation of the deformable portions 30, 34, and 38. As such, the deformable portion 38, as shown in the embodiment in FIG. 2, deformed first, followed by the deformable portion 34 and finally deformable portion 30. Once all three deformable portions 30, 34, 38 are deformed and the seal beads 50, 52 and 54 are sealably engaged with the surfaces 42 and 46, additional axial compression of the deformable tubular 14 does not increase compression of the seal bead 54, but instead causes additional deformation of the leg 87. Such control allows a designer of the seal system precise control over the maximum sealing engagement forces at specific seals.

Seal integrity can also be enhanced by seal redundancy. Seal redundancy between the deformable tubular 14 and the first tubular 22 can be achieved by using both seal beads 50 and 52 to seal to the first tubular 22. Using both seal beads 50, 52, however, could have a negative effect on sealability due to fluid presence causing a hydraulic lock between the first deformable portion 30 and the second tubular 26, for example, and as such may be undesirable. Whether or not to utilize both seal beads 50 and 52 for sealing can therefore be made on an application-by-application basis. In this embodiment, apertures 90 in walls 70 have been incorporated to provide a fluid bypass around the seal of the seal bead 50.

Figure 3:
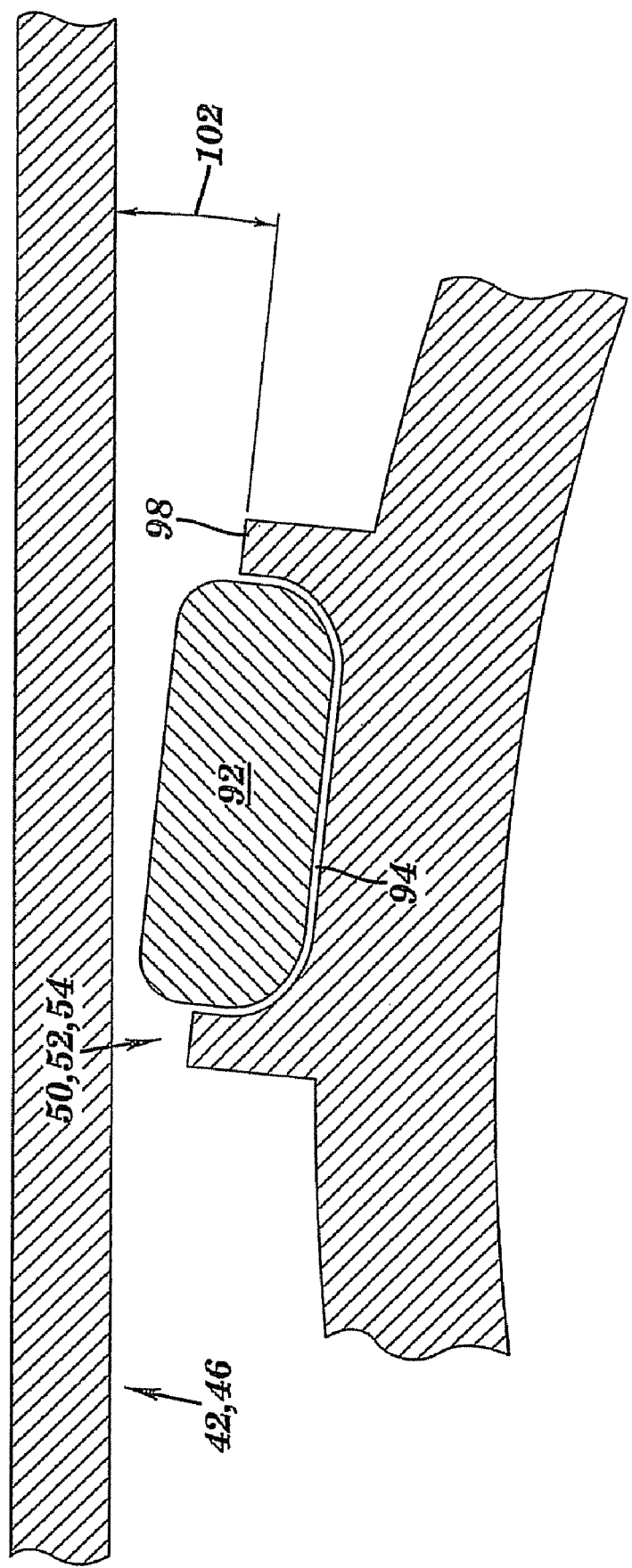
FIG. 3 depicts a partial cross sectional view of the seal bead disclosed herein in a non-sealed configuration.

Referring to FIG. 3, in order to improve seal integrity in situations where one or both of the inwardly facing surface 42 and the outwardly facing surface 46 are not smooth surfaces, for example, it may be desirable to use a soft material 92 in the seal beads 50, 52, 54 of the deformable tubular 14. Such a soft material can more easily conform to imperfections in the surfaces 42, 46 than the base material of the deformable tubular 14, to facilitate sealing. Making the complete deformable tubular 14 out of a soft material could significantly decrease the pressure at which the sealing system 10 is reliable and may therefore be undesirable. Embodiments of the invention can, therefore, use a material softer than the balance of the deformable tubular 14 only at the seal beads 50, 52 and 54, for example. A coating or plating of a softer metal than the balance of the deformable tubular 14 such as lead or copper, for example, could be deposited onto the surface 50, 52, and 54. Alternately, a softer material 92 such as an elastomer or a polymer, for example, could be positioned within a cavity 94 on the beads 50, 52, 54.

In addition to increasing a resiliency of the sealing system 10 through the use of softer materials at the seal engagement the resiliency can be further increased by controlling stress of the deformable tubular 14 in the area of the seal beads 52, 54 so that legs 84, 86, 88, 89 act as springs. One way to accomplish this is to form the deformable tubular 14 so that a surface 98 of the seal beads 50, 52, 54 is not parallel to the surfaces 42, 46 to which they will seal. For example, by setting the surface 98 at a small angle 102 relative to the surface 42, 46 the legs 84, 86, 88, 89 are made to flex in response to radial deformation of the deformable portion 38, which causes the surface 102 to become parallel with the surface 42, 46. By being small the angle 102 can precisely control the amount of flexing, and thus stress, that the legs 84, 86, 88, 89 undergo, thereby preventing plastic deformation. This method provides a designer of the sealing system 10 with a reliable way to control elastic deformation of the deformable tubular 14 when in the deformed and sealed configuration.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A downhole tubular sealing system, comprising:
a deformable tubular sealable to a first tubular and a second tubular thereby capable of effectively sealing an annular space between the first tubular to the second tubular, the deformable tubular comprising:
a first deformable portion configured to deform in a first radial direction;
a second deformable portion configured to deform in a second radial direction, the second radial direction being opposite to the first radial direction; and
a third deformable portion configured to deform in the first radial direction, the second deformable portion being positioned longitudinally between the first deformable portion and the third deformable portion, at least one of the first deformable portion and the third deformable portion being sealable to the first tubular in response to the first deformable portion and the third deformable portion being deformed and the second deformable portion being sealable to the second tubular in response to the second deformable portion being deformed and the first deformable portion, the second deformable portion and the third deformable portion being configured to deform in a sequence.

2. The downhole tubular sealing system of claim 1, wherein the first deformable portion and the third deformable portion are configured to deform radially outwardly.

3. The downhole tubular sealing system of claim 1, wherein at least one of the first deformable portion, the second deformable portion and the third deformable portion has a seal bead that sealingly engages with one of the first tubular and the second tubular.

4. The downhole tubular sealing system of claim 3, wherein nonparallelism of the seal bead with a sealing surface to which it is sealable creates a biasing force in the deformable tubular in response to the seal bead being urged into parallel engagement with the sealing surface through contact with the sealing surface.

5. The downhole tubular sealing system of claim 3, wherein the seal bead includes a material softer than the balance of the deformable tubular.

6. The downhole tubular sealing system of claim 5, wherein the softer material is selected from the group consisting of, lead, copper, polymer and elastomer.

7. The downhole tubular sealing system of claim 5, wherein the seal bead includes a cavity within which the softer material is retained.

8. The downhole tubular sealing system of claim 1, wherein a leg of at least one of the first deformable portion and the third deformable portion is wedgably engagable between the first tubular and the second tubular in response to the deformable tubular being deformed.

9. The downhole tubular sealing system of claim 8, wherein the wedgable engagement of at least one of the first deformable portion and the third deformable portion increases a sealing engagement force of the second deformable portion with the second tubular.

10. The downhole tubular sealing system of claim 9, wherein a length of the leg of at least one of the first deformable portion and the third deformable portion that is wedgably engagable is sized to control the sealing engagement force of at least one of the second deformable portion with the second tubular and the third deformable portion with the first tubular.

11. The downhole tubular sealing system of claim 1, wherein the deformable tubular is work hardenable through deformation thereof.

12. The downhole tubular sealing system of claim 11, wherein work hardening of the deformable tubular increases a pressure against which the sealing system is sealable.

13. The downhole tubular sealing system of claim 1, wherein configuration of the deformable tubular to deform radially includes variations in strength of the deformable tubular.

14. The downhole tubular sealing system of claim 13, wherein the variations in strength of the deformable tubular includes variations in wall thickness thereof.

15. The downhole tubular sealing system of claim 1, wherein relative wall thicknesses of the first deformable portion, the second deformable portion and the third deformable portion control the sequence of deformation.

16. The downhole tubular sealing system of claim 1, wherein at least one of the first deformable portion, the second deformable portion and the third deformable portion is configured such that radial deformation thereof is reversible.

17. The downhole tubular sealing system of claim 1, wherein the deformable tubular is metal.

18. The downhole tubular sealing system of claim 1, wherein the sequence is deformation of the first deformable portion first, the second deformable portion second and the third deformable portion third.

19. A method of sealing downhole tubulars together, comprising:

positioning a deformable tubular in an annular space between a first tubular and a second tubular, the deformable tubular having a first deformable portion a second deformable portion and a third deformable portion, the second deformable portion being positioned longitudinally between the first deformable portion and the third deformable portion;

radially deforming the first deformable portion into contact with the first tubular;

radially deforming the second deformable portion into contact with the second tubular;

radially deforming the third deformable portion into contact with the first tubular;

sequentially controlling the deforming of the first deformable portion relative to the second deformable portion relative to the third deformable portion; and sealingly engaging the first tubular to the second tubular through sealingly engaging the first tubular with at least one of the first deformable portion and the third deformable portion and sealingly engaging the second tubular with the second deformable portion.

20. The method of claim 19, further comprising axially compressing the deformable tubular to radially deform at least one of the first deformable portion the second deformable portion and the third deformable portion.

21. The method of claim 19, further comprising wedgably engaging a leg of at least one of the first deformable portion and the third deformable portion between the first tubular and the second tubular.

22. The method of claim 21, further comprising sizing the leg to control a pressure with which the at least one deformable portion of which the leg is part is sealable to the first tubular and the second tubular.

23. The method of claim 21, further comprising increasing sealing engagement forces between the second deformable portion and the second tubular through wedgably engaging the leg.

24. The method of claim 19, further comprising work hardening the deformable tubular.

25. The method of claim 19, further comprising axially expanding the deformable tubular to contract a radial dimension thereof.

* * * * *